United States Patent [19]

Dewhurst

[11] Patent Number: 5,420,186

[45] Date of Patent: May 30, 1995

[54] INTERNAL MOLD RELEASE AGENTS COMPRISING METALLIC SOAPS COMPATIBILIZED WITH LIQUID QUATERNARY AMMONIUM SALTS

[75] Inventor: John E. Dewhurst, Macungie, Pa.

[73] Assignee: Air Products and Chemicals, Inc., Allentown, Pa.

[21] Appl. No.: 8,921

[22] Filed: Jan. 26, 1993

[51] Int. Cl.$^6$ .............................. C08K 5/09; C08K 5/17
[52] U.S. Cl. .................................... 524/236; 524/394; 524/398; 524/399; 524/400; 524/779; 524/780; 524/786; 524/714
[58] Field of Search ............... 524/236, 322, 399, 400, 524/229, 398, 394, 780, 786, 714

[56] References Cited

U.S. PATENT DOCUMENTS

| | | | |
|---|---|---|---|
| 3,726,952 | 4/1973 | Boden et al. | 264/48 |
| 3,892,687 | 1/1975 | Bechara et al. | 260/2.5 |
| 3,993,652 | 11/1976 | Bechara et al. | 260/268 |
| 4,040,992 | 8/1977 | Bechara et al. | 260/2.5 |
| 4,098,731 | 7/1978 | Bonin et al. | 521/51 |
| 4,111,861 | 9/1978 | Godlewski | 524/322 |
| 4,116,879 | 9/1978 | Bechara et al. | 252/426 |
| 4,220,727 | 9/1980 | Godlewski | 521/110 |
| 4,519,965 | 5/1985 | Taylor et al. | 264/51 |
| 4,585,803 | 4/1986 | Nelson et al. | 521/105 |
| 4,585,829 | 4/1086 | Kuo et al. | 524/778 |
| 4,753,966 | 6/1988 | Haas et al. | 521/51 |
| 4,764,537 | 8/1988 | Horn et al. | 521/51 |
| 4,766,172 | 8/1988 | Weber et al. | 524/783 |
| 4,886,838 | 12/1989 | Dewhurst | 521/117 |
| 4,897,428 | 1/1990 | Dewhurst | 521/115 |
| 5,002,999 | 3/1991 | Lowery et al. | 524/715 |
| 5,084,545 | 1/1992 | Napata et al. | 524/714 |
| 5,157,057 | 10/1992 | Pence et al. | 521/118 |
| 5,182,034 | 1/1993 | Meyer et al. | 524/779 |

FOREIGN PATENT DOCUMENTS

| | | | |
|---|---|---|---|
| 0409433 | 1/1991 | European Pat. Off. | 524/399 |
| 0478151A1 | 4/1992 | European Pat. Off. . | |
| 0514994A1 | 11/1992 | European Pat. Off. . | |
| 1907121 | 2/1971 | Germany . | |
| 3607447A1 | 12/1987 | Germany . | |
| 0207622 | 8/1988 | Japan | 524/399 |
| WO84/03288 | 4/1984 | WIPO . | |

*Primary Examiner*—Peter Szekely
*Attorney, Agent, or Firm*—Michael Leach; James C. Simmons; William F. Marsh

[57] ABSTRACT

In an active hydrogen-containing B-side composition for reaction with a polyisocyanate-containing A-side composition to make a polyurethane or polyurethaneurea elastomer by reaction injection molding, the improvement which comprises a mold release composition consisting essentially of (1) a liquid quaternary ammonium salt and (2) a metal salt of a fatty acid.

19 Claims, No Drawings

INTERNAL MOLD RELEASE AGENTS COMPRISING METALLIC SOAPS COMPATIBILIZED WITH LIQUID QUATERNARY AMMONIUM SALTS

FIELD OF THE INVENTION

The present invention relates to internal mold release compositions for use in the reaction injection molding of elastomeric articles.

BACKGROUND OF THE INVENTION

Reaction injection molding (RIM) is a versatile process by which elastomeric and thermoset parts can be fabricated. The RIM process involves high pressure impingement mixing of a polyisocyanate stream (A-side) and an active-hydrogen containing isocyanate-reactive stream (B-side) followed by immediate injection into the closed mold. The primary appeal of this process lies in its inherently high productivity. One factor which limits productivity, however, is the necessity to spray the molds with external mold release prior to each injection. This is a time-consuming task and often has a negative environmental impact. This difficulty can be overcome by the incorporation of an internal release agent into the formulation via one of the two streams to significantly increase the number of molding cycles which can be accomplished between mold release sprayings.

The use of metallic soaps as release agents has been known for a long time. Zinc stearate, in particular, is known to be soluble in aliphatic amines, such as the polyether polyamines and ethylenediamine-initiated polyols. This is the basis for its use as an internal mold release (IMR) agent in RIM. If zinc stearate is simply dispersed as a fine powder in polyol blends, it does not dissolve and does not act as a release agent. Various patents teach that zinc soaps can be compatibilized or dissolved in polyol blends with amines, enamines, ketimines or salts of amidines or guanidines, and that excellent releasability of the subsequent RIM parts will result.

While the IMR approach is commercially applied, there remain significant shortcomings to the currently available IMR systems. The amine-solubilized metallic soaps, which are most commonly used in this application, have been implicated in reactivity and/or physical property deficiencies for the RIM elastomers in which they are used. Furthermore, the high melting points and limited solubilities of the metallic soaps make them prone to precipitation in the RIM processing equipment, necessitating replacement of the piping regularly.

Salts formed by the neutralization of tertiary amines with fatty acids have been disclosed (U.S. Pat. No. 4,098,731) as IMR for integral-skin urethane foams. Similarly, salts of primary amines are disclosed in U.S. Pat. No. 3,726,952.

U.S. Pat. No. 4,220,727 discloses aralkyl quaternary ammonium salts as release agents. All of the examples are chloride salts containing at least one "phenyl stearyl" group.

U.S. Pat. No. 4,519,965 discloses an internal mold release agent mixture comprising a zinc carboxylate and a compatibilizer for the zinc carboxylate which is a nitrogen-containing, isocyanate reactive, acyclic compound or a nitrogen-containing, isocyanate-reactive polymer.

U.S. Pat. No. 4,753,966 discloses mold release compositions which are liquid at room temperature comprising a zinc carboxyl ate and at least one organic compound of the formula $H_2N-(CH_2)_m-X$ where X denotes a defined organic group containing nitrogen and/or oxygen.

U.S. Pat. No. 4,766,172 discloses mold release compositions which are liquid at room temperature comprising a zinc carboxylate and at least one defined organic compound containing tertiary nitrogen atoms.

U.S. Pat. No. 4,764,537 discloses internal mold release agents comprising at least one ketimine, aldimine, enimine, cyclic Schiff base, an organic carboxylic acid having 8 to 24 carbon atoms and, optionally, a carboxylic acid.

U.S. Pat. No. 4,886,838 discloses a mold release agent comprising a zinc carboxylate and a specific salt of an amidine-group containing compound.

U.S. Pat. No. 4,897,428 discloses an internal mold release agent comprising zinc oleate or zinc laurate and a specific fatty amine derivative.

U.S. Pat. No. 5,002,999 discloses an internal mold release composition comprising (a) a zinc carboxylate which is zinc stearate, zinc laurate or zinc oleate and (b) a compatibilizer comprising a dispersion of polyurea and/or a polyhydrazodicarbonamide in an organic compound containing at least one hydroxyl group, in an amount sufficient to solubilize the zinc carboxylate.

U.S. Pat. No. 4,585,803 discloses internal mold release compositions comprising a tertiary amine compound and a metal salt of a carboxylic acid, the acid containing at least one lipophilic group which renders it incompatible with an active hydrogen containing composition.

WO 84/03288 discloses an active hydrogen-containing composition which provides mold release properties to a molded article prepared from the composition and a polyisocyanate, the composition comprising (A) a metal salt of an organic carboxylic acid, (B) an active hydrogen-containing material having a plurality of either one or a combination of primary amine and secondary amine groups and optionally hydroxyl and/or thiol groups, the portion of component (B) containing primary amine groups and/or secondary amine groups and component (A) being present in a weight ratio of at least 2:1; and optionally, (C) an organic material containing a carboxylic acid group wherein at least one of components A, B or C contains at least one lipophilic group.

U.S. Pat. No. 4,040,992 discloses the use of N-hydroxyalkyl quaternary ammonium carboxylate salts as catalysts in the production of polyisocyanurates and polyurethanes. Among the exemplary preferred catalysts are N-hydroxypropyl trimethyl ammonium salts of carboxylic acids such as those of formic and acetic acids and of fatty acids such as hexanoic and octanoic acids and the like.

U.S. Pat. Nos. 3,892,687; 3,993,652 and 4,116,879 disclose the use of N-hydroxyalkyl quaternary ammonium phenolate salts as catalysts in the production of polyisocyanurates and polyurethanes.

U.S. patent application Ser. No. 07/992,404 filed 16 Dec. 1992 discloses an internal mold release composition consisting essentially of (1) the reaction product of a mixture of a carboxylic acid, a tertiary amine, and a reactive epoxide and (2) a carboxy functional siloxane as an additive to the active hydrogen-containing B-side composition for reaction with a polyisocyanate-containing A-side composition to make a polyurethane or polyurethaneurea elastomer.

SUMMARY OF THE INVENTION

The present invention is directed to a method for making a polyurethane, polyurethaneurea or polyurea elastomer in which a reactive mixture is formed in a mold cavity and cured. The reactive mixture contains polyol, organic polyisocyanate, urethane catalyst, optionally a diol and/or diamine chain extender, and an internal mold release (IMR) additive. The present invention provides as the (IMR) additive a composition consisting essentially of (1) a liquid quaternary ammonium salt and (2) a metal salt of an organic carboxylic acid, i.e., a metallic soap.

The resulting compositions function as IMR agents. The metallic salts of the carboxylic acids are compatibilized by the liquid quaternary ammonium salts in which they dissolve.

Another embodiment of the invention is a polyol-containing B-side composition for reaction with a polyisocyanate-containing A-side composition. The B-side composition consists essentially of a polyol, urethane catalyst, the IMR additive, optionally a diol and/or diamine chain extender, and silicone surfactant.

DETAILED DESCRIPTION OF THE INVENTION

The present invention is directed to an IMR composition for use in a molding process, an isocyanate-reactive composition containing the IMR composition, and the use of the IMR composition in a molding process.

The IMR composition consists essentially of a liquid quaternary ammonium salt and a metallic soap. "Liquid quaternary ammonium salt" means a quaternary ammonium salt which is liquid in the use temperature range of polyurethane polyol blends in RIM processes, for example, 0° to 45° C.

The quaternary ammonium cation may be prepared from any aliphatic tertiary amine, aromatic amine or heterocyclic amine, which amine may contain other functional groups such as ether linkages and hydroxyl groups. An example of the latter type would be an amine-initiated polyether polyol or propoxylated fatty amines. It is preferred that at least one of the substituents on the quaternary ammonium nitrogen be a $C_{12}$–$C_{18}$ alkyl group.

The counter anion may be a halide, such as fluoride, bromide, iodide, or preferably chloride, a carboxylate ion or a phenolate ion.

Suitable quaternary ammonium salts can be prepared from the reaction of a tertiary amine with an alkyl halide according to the well known Menshutkin reaction, desirably with at least one of the alkyl groups on the tertiary amine or the alkyl halide being a $C_{12}$–$C_{18}$ alkyl group.

Suitable quaternary ammonium salts can be prepared from the reaction of a mixture of an organic carboxylic acid, preferably a $C_{12}$–$C_{36}$ fatty acid, a tertiary amine having at least one $C_{12}$–$C_{18}$ alkyl substituent, and a reactive $C_2$–$C_{21}$ epoxide. This reaction product comprises a mixture of the hydroxy-functional quaternary ammonium salt of the fatty acid with varying amounts of free tertiary amine and the hydroxy-functional ester of the fatty acid with the epoxide.

Suitable quaternary ammonium salts can also be prepared from the reaction of a mixture of a phenolic compound, preferably a $C_{12}$–$C_{36}$ fatty phenol, a tertiary amine, preferably one having at least one $C_{12}$–$C_{18}$ alkyl substituent, and a reactive epoxide, preferably a $C_2$–$C_{21}$ epoxide. The reaction product comprises a mixture of the hydroxy-functional quaternary ammonium salt of the phenoxide with varying amounts of free tertiary amine and the hydroxy-functional ether of the phenol with the epoxide.

Illustrative of suitable tertiary amines for use in making the quaternary ammonium salts are those that contain at least one higher hydrocarbon substituent, preferably two such substituents, having 12 to 18 carbon atoms each. Such suitable tertiary amines would have the formula

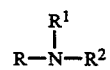

where:
R is $C_1$–$C_4$ alkyl group such as methyl or ethyl,
$R^1$ is a $C_{12}$–$C_{18}$ hydrocarbyl group such as lauryl, myristyl, cetyl or stearyl, and
$R^2$ is R or $R^1$.

Specific examples include dimethylstearylamine, trilaurylamine, dimethyloleylamine, and methyldistearylamine.

Other suitable tertiary amines would include alkanolamines such as dimethylaminoethanol, triethanolamine, and methyldiethanolamine; heterocyclic amines such as pyridine, 4-dimethylaminopyridine and N-ethylmorpholine; aromatic amines such as N,N-dimethylaniline; and bicyclic amines such as triethylenediamine, quinuclidine and 3-quinuclidinol.

Carboxylic acids suitable for use in the present invention include simple monofunctional organic acids and polyfunctional acids, especially dimer and trimer acids; acid-functional waxes, such as Epolene E-15 from Eastman and acids containing other functional groups, such as glycolic acid, 12-hydroxystearic acid, sakosines and the like.

The preferred carboxylic acids are fatty acids, i.e., mono- or dicarboxylic acids having from about 12 to 36 carbon atoms such as, for example, lauric, myristic, linoleic, linolenic and montanic acids and most desirably is a monocarboxylic acid with 16 to 18 carbon atoms such as palmitic, stearic or oleic acids.

Phenolic compounds suitable for use in the present invention include phenol and the $C_{12}$–$C_{36}$ alkyl and alkoxy substituted phenols, preferably the $C_{12}$–$C_{18}$ fatty alkyl phenols, and especially p-dodecylphenol.

Exemplary of suitable $C_2$–$C_{21}$ reactive epoxides are the simple monoepoxides such as ethylene oxide, propylene oxide, butylene oxide, styrene oxide and the like; glycidyl ethers including those of $C_{12}$–$C_{18}$ higher alcohols, simple $C_2$–$C_{18}$ glycols or bisphenols; silicone containing epoxides such as Dow Corning's Z-6040; and epoxidized olefins such as Poly bd 600 and 605 from Atochem or epoxidized vegetable oils. It is preferred to use propylene oxide or the monoglycidyl ether of a $C_{12}$–$C_{18}$ higher alcohol. Suitable higher alcohols include lauryl, myristyl, cetyl, and stearyl alcohols.

The quaternary ammonium compositions may generally be prepared by first heating the tertiary amine, reactive epoxide and fatty acid or phenolic compound together at $\geq 70°$ C. until the epoxide band at 916 cm$^{-1}$ is absent from the infrared spectrum. Although the tertiary amine, reactive epoxide and fatty acid or phenolic compound components may be reacted in various relative amounts to produce a quaternary ammonium carboxylate or phenolate, it is preferred to use substantially stoichiometric amounts. (See U.S. Pat. Nos. 4,040,992 and 4,582,861 for quaternary ammonium carboxylates and U.S. Pat. Nos. 3,892,687; 3,993,652 and 4,116,879 for quaternary ammonium phenolates.)

A liquid quaternary ammonium halide, carboxylate or phenolate is mixed with the metal salt of a fatty acid in an amount that is effective to promote the release of the molded RIM article from the mold. While this depends upon the equivalent weight of the quaternary ammonium salt, the nominal range is a 3:1 to 1:3, preferably 1:1, weight ratio.

Suitable metallic soaps include those of organic carboxylic acids with at least 12 carbon atoms, particularly 12 to 36 carbon atoms, in the chain and metals such as lithium, sodium, potassium, calcium, magnesium, aluminum, titanium, zinc or any others which dissolve in the liquid quaternary ammonium and impart release performance in a particular formulation. The preferred carboxylic acids are fatty acids, i.e., mono- or dicarboxylic acids having from about 12 to 36 carbon atoms such as, for example, lauric, myristic, linoleic, linolenic and montanic acids and most desirably is a monocarboxylic acid with 16 to 18 carbon atoms such as palmitic, stearic or oleic acids. The preferred metallic soaps include aluminum stearate and especially zinc stearate.

The IMR compositions resulting from the reaction are suitable for use with either flexible or rigid, optionally cellular, polyurethane or polyurethane/urea elastomers. The molded articles may possess various combinations of these properties such as rigid, non-cellular elastomers or flexible, cellular products for use, for example, as shoe soles.

The IMR composition is used in an amount sufficient to effect release of the molded article from the mold surfaces. A suitable amount would be 0.5 to 10 wt %, preferably 3 to 5 wt %, based on the B-side, or isocyanate-reactive, composition comprising at least one high molecular weight active hydrogen containing compound, amine and/or metallic urethane catalyst and, optionally, a diol or diamine chain extender and silicone surfactant. The reaction mixture is preferably processed at an isocyanate index of from 70 to 130.

Suitable polyisocyanates for use in the present invention are aliphatic, cycloaliphatic, araliphatic and aromatic polyisocyanates which are well known in the art. Specific examples include ethylene diisocyanate, 1,4-tetramethylene diisocyanate, 1,6-hexamethylene diisocyanate, cyclohexane-1,3- and 1,4-diisocyanate and isophorone diisocyanate. Typical aromatic polyisocyanates include phenylene diisocyanate, toluene diisocyanate and 4,4'-diphenylmethane diisocyanate. Especially suitable are the 2,4- and 2,6-toluene diisocyanates individually or together as their commercially available mixtures. Other especially suitable mixtures of diisocyanates are those known commercially as "crude MDI" also known as "PAPI", which contain about 60% of 4,4'-diphenylmethane diisocyanate along with other isomeric analogous higher polyisocyanates. Also suitable are prepolymers of these polyisocyanates comprising a partially prereacted mixture of polyisocyanate and polyether or of polyester polyols disclosed hereinafter.

The polyether polyols useful in the invention include primary and secondary hydroxyl-terminated polyether polyols greater than 500 average molecular weight having from 2 to 6 functionality, preferably from 2 to 3, and a hydroxyl equivalent weight of from 250 to about 2500. Mixtures of polyether polyols may be used.

The polyether polyols are made from an appropriate initiator to which a lower alkylene oxide such as ethylene oxide, propylene oxide, butylene oxide or mixtures thereof is added resulting in hydroxyl-terminated polyols. When two or more oxides are used, they may be present as random mixtures or as blocks of one or the other polyether. Thus the polyalkylene ether polyols include the poly(alkylene oxide) polymers, such as poly(ethylene oxide) and poly(propylene oxide) polymers and copolymers with a terminal hydroxyl group derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and tri-functional materials and/or different molecular weight or different chemical composition materials may be used.

Useful polyester polyols include those produced by reacting a carboxylic acid with an excess of a diol; for example, adipic acid with ethylene glycol or butane diol, or a lactone with an excess of a diol, such as caprolactone and propylene glycol.

Illustrative of suitable hydroxyl group-containing chain extenders are ethylene glycol, propylene glycol, butane diols, 1,6-hexane diol, diethylene glycol, triethylene glycol, tetraethylene glycol, dipropylene glycol, tripropylene glycol, glycerol and trimethylol propane.

The aromatic diamine chain extenders useful in this invention include for example, 1-methyl-3,5-diethyl-2,4-diaminobenzene; 1-methyl-3,5-diethyl-2,6-diaminobenzene (both these materials are also called diethyltoluenediamine or DETDA) 1,3,5-triethyl-2,6-diaminobenzene; 2,4-dimethyl-6-t-butyl-3,5-diaminobenzene; 3,5,3 ',5'-tetraethyl-4,4'-diaminodiphenylmethane; 1-methyl-3-t-butyl-2,4-diaminobenzene; 1-methyl-5-t-butyl-2,6-diaminobenzene (both these materials are also called t-butyl toluenediamine or TBTDA) and the like. Particularly preferred aromatic diamine chain extenders are DETDA and TBTDA. It is within the scope of the invention to include some aliphatic chain extender materials as described in U.S. Pat. Nos. 4,246,363 and 4,269,945.

Urethane catalysts include amine and tin catalysts well known in the art such as for example, triethylenediamine and dibutyltin dilaurate. Suitable amounts of catalyst may range from about 0.025 to 0.3 parts, preferably 0.05 to 0.2 parts, per 100 parts per weight polyol in the elastomer composition.

Other conventional ingredients may be employed as needed, such as, for example, foam stabilizers, also known as silicone oils or surfactants, and reinforcing materials.

The compositions according to the present invention may be molded using conventional processing techniques and are especially suited for processing by the RIM process. In general, two separate streams are intimately mixed and subsequently injected into a suitable mold, although it is possible to use more than two streams. The first stream contains the polyisocyanate component, while the second stream contains the polyol component, urethane catalyst, chain extender, the internal mold release composition and any other additive which is to be included.

In the examples, the following ingredients were used:

Multranol 9139—A glycerin-initiated polyoxyalkylene polyether triol having a hydroxyl number of 28 from Mobay Corporation.

Multranol 9143—A glycerin-initiated polyoxyalkylene polyether triol having a hydroxyl number of 35 from Mobay Corporation.

DETDA—80/20 mixture of 3,5-diethyl-2,4-toluenediamine and 3,5-diethyl-2,6-toluenediamine from Ethyl Corp.

XCE-89—an 80/20 mixture of 5-tert-butyl-2,4-toluenediamine and 5-tert-butyl-2,6-toluenediamine.

DC 198—a silicone surfactant from Air Products and Chemicals, Inc.

DABCO® T-12—dibutyltin dilaurate from Air Products and Chemicals, Inc.

DABCO 33 LV®—a 33% solution of triethylenediamine in a glycol carrier from Air Products and Chemicals, Inc.

Mondur PF—4,4'-diphenylmethanediisocyanate which has been liquified by reaction with a low molecular weight glycol to an NCO content of about 22.64 from Mobay Corporation.

Ethoquad 18/25—the quaternary salt from the reaction of methyl chloride with the product of 15 moles of ethylene oxide on tallow amine from Akzo Chemie.

Aliquat 336—methyltrioctylammonium chloride from Henkel Corp.

Armeen DM12D—dimethyllaurylamine from Akzo Chemie

Z-6040—3-glycidoxypropyltrimethoxysilane from Dow-Corning Corp.

Kenamide E—erucamide from Witco Corp.

Poly bd R20LM—hydroxyl-terminated polybutadiene polymer from Atochem.

Epodil 748—$C_{12}$-$C_{14}$ alkyl glycidyl ether from Pacific Anchor.

SYNTHESIS EXAMPLES

EXAMPLE 1

A solution of 120 g of erucamide (Kenamide E) in 180 g of methyl trioctylammonium chloride (Aliquat 336) was made by stirring the mixture at 80° C. until all the solids dissolved.

EXAMPLE 2

A solution of one wt part of zinc octoate in one wt part of methyl trioctylammonium chloride (Aliquat 336) was made by stirring the mixture at 80° C. until all the solids dissolved.

EXAMPLE 3

A solution of one wt part of zinc stearate in two wt parts of methyl trioctylammonium chloride (Aliquat 336) was made by stirring the mixture at 80° C. until all the solids dissolved.

EXAMPLE 4

A solution of 140 g of zinc stearate, 120 g of methyl trioctylammonium chloride (Aliquat 336) and 210 g of hydroxyl-terminated polybutadiene polymer (Poly bd R20LM) was made by stirring at 80° C. until all the solids dissolved.

EXAMPLE 5

A solution of equal wt parts of zinc stearate, 3-glycidoxypropyltrimethoxysilane (Z-6040) and methyl trioctylammonium chloride (Aliquat 336) was made by stirring the mixture at 80° C. until all the solids dissolved.

EXAMPLE 6

A liquid quaternary ammonium salt was made by heating an equimolar mixture of dimethyllaurylamine (Armeen DM12D), stearic acid and 3-glycidoxypropyltrimethoxysilane (Z-6040) to 70° C. overnight. The IR spectrum showed the absence of epoxide and the presence of carboxylate anion. The product was a dark brown, low viscosity liquid.

EXAMPLE 7

A solution of one wt part of zinc stearate and two wt parts of the fatty liquid quaternary ammonium salt from Example 6 was made by stirring the mixture at 80° C. until all the solids dissolved.

EXAMPLE 8

A solution of one wt part of Ethoquad 18/25 quaternary salt, 1.25 wt parts of sodium oleate and 3 wt parts of ethylene glycol was made by stirring the mixture at 70° C. until all the solids dissolved.

EXAMPLE 9

A solution of one wt part of para-dodecylphenol, 1.25 wt parts of sodium oleate and 3 wt parts of 1,2-propylene glycol was made by stirring the mixture at 70° C. until all the solids were dissolved.

RIM EXAMPLES

EXAMPLES 10 AND 11

RIM parts were made on an EMB PU-20 RIM machine using the polyol formulation shown in Table 1. The isocyanate used was Mondur PF. For these tests only one side of the mold was sprayed with wax-based external mold release. It can be seen that simply dispersing zinc stearate in a blend containing aromatic amine XCE-89 (Example 11) was insufficient to effect release performance compared to Example 10 which did not contain any zinc stearate.

TABLE 1

| Example: | 10 | 11 |
|---|---|---|
| E-9143 | 81.8 | 79.8 |
| XCE-89 | 18.0 | 18.0 |
| Zinc Stearate |  | 2.0 |
| Dabco T-12 | 0.1 | 0.1 |
| Dabco 33-LV | 0.1 | 0.1 |
| # of Releases | 5 | 5 |

The RIM parts in following Examples 12–21 were made on a Battenfeld SHK 14 Piston Metering RIM machine. Plaques weighing 128 grams (including the aftermixer and runner) were made using a stainless steel mold sprayed with ChemTrend RCTW-2006 external mold release (EMR). One face of the plaque mold was treated with EMR prior to each shot while the other was treated prior only to the first shot. A system with no EMR agent gives 5 to 7 shots before severe sticking and delamination takes place. A system with at least fifteen releases before such sticking was judged to be releasing well.

EXAMPLES 12-15

Table 2 shows the results of RIM trials which did not release well. These included Ex 12 which had no IMR, Ex 13 which contained only Aliquat 336 quaternary salt, Ex 14 which contained Aliquat 336 quaternary salt and a fatty amide (Synthesis Ex 1), and Ex 15 which contained Aliquat 336 quaternary salt and a zinc soap of a low molecular weight acid (Synthesis Ex 2).

TABLE 2

| | Poor Release Perfomance | | | |
|---|---|---|---|---|
| RIM Example: | 12 | 13 | 14 | 15 |
| Synthesis Ex. | | | 1 | 2 |
| E 9139 | 81 | 79 | 76 | 77 |
| DETDA | 18 | 18 | 18 | 18 |
| DC 198 | 0.8 | 0.8 | 0.8 | 0.8 |
| Dabco T-12 | 0.1 | 0.1 | 0.1 | 0.1 |
| Dabco 33 LV | 0.1 | 0.1 | 0.1 | 0.1 |
| Aliquat 336 | — | 2 | 3 | 2 |
| Kenamide E | — | — | 2 | — |
| Zinc Octoate | — | — | — | 2 |
| # of Releases | 4–8 | 9 | 9–11 | 7–8 |

EXAMPLES 16-19

Table 3 shows the results of RIM trials which included examples of this invention using liquid quaternary ammonium salts to dissolve zinc stearate. A comparison of Examples 16, 17 and 18 shows that the epoxide Z-6040 is detrimental to rel ease, while a quaternary ammonium salt made from it is not.

TABLE 3

| | Release Performance of Quats + Zinc Stearate | | | |
|---|---|---|---|---|
| RIM Example: | 16 | 17 | 18 | 19 |
| Synthesis Ex. | 3 | 4 | 5 | 7 |
| E 9139 | 75 | 74 | 75 | 75 |
| DETDA | 18 | 18 | 18 | 18 |
| DC 198 | 0.8 | 0.8 | 0.8 | 0.8 |
| Dabco T-12 | 0.1 | 0.1 | 0.1 | 0.1 |
| Dabco 33 LV | 0.1 | 0.1 | 0.1 | 0.1 |
| Aliquat 336 | 4 | 2 | 2 | |
| Zinc Stearate | 2 | 2 | 2 | 2 |
| Poly bd R20LM | | 3 | | |
| Z-6040 | | | 2 | |
| Ex. 6 Quat | | | | 4 |
| # of Releases | 20 | 20 | 8–9 | >15 |

EXAMPLES 20 AND 21

Table 4 shows the results of inclusion of a quaternary ammonium salt with a solution of sodium oleate. The OH-functional quaternary salt Ethoquad 18/25 greatly enhances release. In this case the level of metallic soap is lower than the 2% used for the zinc stearate examples to show the enhancement from the quaternary ammonium salt.

TABLE 4

| Release Performance of Quats + Sodium Oleate | | |
|---|---|---|
| RIM Example: | 20 | 21 |
| Synthesis Ex. | 8 | 9 |
| E 9139 | 75.75 | 75.75 |
| DETDA | 18 | 18 |
| DC 198 | 0.8 | 0.8 |
| Dabco T-12 | 0.1 | 0.1 |
| Dabco 33 LV | 0.1 | 0.1 |
| Sodium oleate | 1.25 | 1.25 |
| Ethoquad 18/25 | 1 | |
| Ethylene glycol | 3 | |
| p-dodecylphenol | | 1 |
| Propylene glycol | | 3 |
| # of Release | 13–14 | 7–8 |

STATEMENT OF INDUSTRIAL APPLICATION

An internal mold release composition is provided for making reaction injection molded polyurethane, polyurethaneurea, and polyurea articles.

I claim:

1. In a polyurethane, polyurethaneurea or polyurea elastomer prepared by reaction injection molding a polyisocyanate-containing A-side composition with a B-side composition which contains a polyol, a urethane catalyst and a mold release composition, the improvement which comprises the mold release composition consisting essentially of (a) a liquid aliphatic quaternary ammonium salt, which quaternary ammonium salt is
   (i) the reaction product of an aliphatic tertiary amine with an alkyl halide;
   (ii) the reaction product of an organic carboxylic acid, an aliphatic tertiary amine, and a $C_2$-$C_{21}$ reactive epoxide; or
   (iii) the reaction product of a $C_{12}$-$C_{36}$ alkyl or alkoxy phenol, an aliphatic tertiary amine and a $C_2$-$C_{21}$ reactive epoxide; and
(b) a metal salt of an organic carboxylic acid containing at least 12 carbon atoms.

2. The elastomer of claim 1 in which at least one substituent on the quaternary nitrogen is a $C_{12}$-$C_{18}$ alkyl group.

3. The elastomer of claim 1 in which the quaternary ammonium salt is the (i) reaction product of an aliphatic tertiary amine with an alkyl halide.

4. The elastomer of claim 1 in which the quaternary ammonium salt is the (ii) reaction product of an organic carboxylic acid, an aliphatic tertiary amine, and a $C_2$-$C_{21}$ reactive epoxide.

5. The elastomer of claim 4 in which the organic carboxylic acid of the (ii) reaction product is a $C_{12}$-$C_{36}$ fatty acid.

6. The elastomer of claim 1 in which the quaternary ammonium salt is the (iii) reaction product of a $C_{12}$-$C_{36}$ alkyl or alkoxy phenol, an aliphatic tertiary amine and a $C_2$-$C_{21}$ reactive epoxide.

7. The elastomer of claim 6 in which the phenol of the (iii) reaction product is a $C_{12}$-$C_{18}$ alkyl phenol.

8. The elastomer of claim 1 in which the reactive epoxide of the (ii) or (iii) reaction product is propylene oxide or the monoglycidyl ether of a $C_{12}$-$C_{18}$ higher alcohol.

9. The elastomer of claim 1 in which the metal is lithium, sodium, potassium, calcium, magnesium, aluminum, titanium or zinc.

10. The elastomer of claim 9 in which the carboxylic acid is stearic acid.

11. In a polyurethane, polyurethaneurea or polyurea elastomer prepared by reaction injection molding a polyisocyanate-containing A-side composition with a B-side composition which contains a polyol, a urethane catalyst and a mold release composition, the improvement which comprises the mold release composition consisting essentially of (a) a liquid aliphatic quaternary ammonium salt having at least one $C_{12}$-$C_{18}$ alkyl group on the quaternary nitrogen, which quaternary ammonium salt is (i) the reaction product of an aliphatic tertiary amine with an alkyl halide, (ii) the reaction product of a $C_{12}$–$C_{36}$ fatty acid, an aliphatic tertiary amine, and a $C_2$–$C_{21}$ reactive epoxide, or (iii) the reaction product of a $C_{12}$–$C_{36}$ alkyl or alkoxy phenol, an aliphatic tertiary amine and a $C_2$–$C_{21}$ reactive epoxide, and (b) a metal $C_{12}$–$C_{36}$ organic carboxylate, the metal being lithium, sodium, potassium, calcium, magnesium, aluminum, titanium or zinc.

12. The elastomer of claim 11 in which the quaternary ammonium salt is the (i) reaction product of an aliphatic tertiary amine with an alkyl halide.

13. The elastomer of claim 11 in which the quaternary ammonium salt is the (ii) reaction product of a $C_{12}$–$C_{36}$ fatty acid, an aliphatic tertiary amine, and a $C_2$–$C_{21}$ reactive epoxide.

14. The elastomer of claim 11 in which the quaternary ammonium salt is the (iii) reaction product of a $C_{12}$–$C_{36}$ alkyl or alkoxy phenol, an aliphatic tertiary amine and a $C_2$–$C_{21}$ reactive epoxide.

15. The elastomer of claim 14 in which the phenol of the (iii) reaction product is a $C_{12}$–$C_{18}$ alkyl phenol.

16. The elastomer of claim 11 in which the reactive epoxide of the (ii) or (iii) reaction product is propylene oxide or the monoglycidyl ether of a $C_{12}$–$C_{18}$ higher alcohol.

17. The elastomer of claim 11 in which the metal carboxylate is aluminum stearate or zinc stearate.

18. In a polyurethane, polyurethaneurea or polyurea elastomer prepared by reaction injection molding a polyisocyanate-containing A-side composition with a B-side composition which contains a polyol, a urethane catalyst and a mold release composition, the improvement which comprises the mold release composition consisting essentially of (a) methyl trioctylammonium chloride and (b) a metal $C_{12}$–$C_{36}$ organic carboxylate in which the metal is lithium, sodium, potassium, calcium, magnesium, aluminum, titanium or zinc.

19. The elastomer of claim 18 in which the metal carboxylate is zinc stearate.

* * * * *